US005096796A

United States Patent [19]

Mammino et al.

[11] Patent Number: 5,096,796

[45] Date of Patent: Mar. 17, 1992

[54] BLOCKING AND OVERCOATING LAYERS FOR ELECTRORECEPTORS

[75] Inventors: Joseph Mammino, Penfield; Oscar G. Hauser, Rochester; Dennis A. Abramsohn, Pittsford; Deborah Nichol-Landry, Rochester; Donald S. Sypula, Penfield; Robert Anderson, Fairport; Richard L. Schank, Pittsford, all of N.Y.

[73] Assignee: Xerox Corporation, Stamford, Conn.

[21] Appl. No.: 531,337

[22] Filed: May 31, 1990

[51] Int. Cl.[5] .......... B32B 9/00

[52] U.S. Cl. .......... 430/67; 428/76; 428/195

[58] Field of Search .......... 430/67; 428/76, 195

[56] References Cited

U.S. PATENT DOCUMENTS

| | | | |
|---|---|---|---|
| 3,635,809 | 1/1972 | Seki et al. | 204/181 |
| 3,640,708 | 2/1972 | Humphriss et al. | 96/1.5 |
| 3,747,005 | 7/1973 | Freimark et al. | 330/22 |
| 3,859,576 | 1/1975 | Scheckler et al. | 317/262 A |
| 3,932,179 | 1/1976 | Perez-Albuerne | 96/1.5 |
| 4,006,020 | 2/1977 | Polastri | 96/1.5 |
| 4,010,031 | 3/1977 | Onishi et al. | 96/1 |
| 4,082,551 | 4/1978 | Steklenski et al. | 428/420 |
| 4,123,267 | 10/1978 | Dorer | 427/76 |
| 4,251,612 | 2/1981 | Chu et al. | 430/59 |
| 4,260,671 | 4/1981 | Merrill | 430/67 |
| 4,282,294 | 8/1981 | Lee et al. | 430/1 |
| 4,286,033 | 8/1981 | Neyhart et al. | 430/58 |
| 4,338,387 | 7/1982 | Hewitt | 430/58 |
| 4,390,609 | 6/1983 | Wiedemann | 430/58 |
| 4,404,574 | 9/1983 | Burwasser et al. | 346/153.1 |
| 4,439,509 | 3/1984 | Schank | 430/132 |
| 4,472,491 | 9/1984 | Wiedemann | 430/58 |
| 4,485,161 | 11/1984 | Scozzafava et al. | 430/64 |
| 4,565,760 | 1/1986 | Schank | 430/66 |
| 4,666,780 | 5/1987 | Krum | 428/418 |
| 4,743,492 | 5/1988 | Wilson | 428/216 |
| 4,770,963 | 9/1988 | Pai et al. | 430/64 |
| 4,804,607 | 2/1989 | Atsumi | 430/67 |
| 4,837,137 | 6/1989 | Aizawa et al. | 430/65 |

*Primary Examiner*—Patrick J. Ryan
*Assistant Examiner*—Kam F. Lee
*Attorney, Agent, or Firm*—Oliff & Berridge

[57] ABSTRACT

An ionographic imaging member has a conductive layer overcoated by a charge accepting layer. Overcoating layers of acrylate, polycarbonate, polyester, polyurethane, acrylic homopolymer or copolymer and the like are provided. Blocking layers may be provided for preventing charge injection and reducing surface charge decay and bulk charge trapping. The charge accepting layer may be doped with a charge clocking material for preventing charge injection. The overcoating and blocking layers may be one and the same.

39 Claims, 1 Drawing Sheet

BLOCKING AND OVERCOATING LAYERS FOR ELECTRORECEPTORS

BACKGROUND OF THE INVENTION

This invention is directed generally to ionography, and more specifically, to electroreceptors for ionographic imaging.

In ionography, latent images are formed by depositing ions in a prescribed pattern onto an electroreceptor surface. The ions may be applied by a linear array of ion emitting devices or ion heads, creating a latent electrostatic image. Alternatively, the electroreceptor surface may be charged to a uniform polarity, and portions discharged with an opposite polarity to form a latent image. Charged toner particles are then passed over these latent images, causing the toner particles to remain where a charge has previously been deposited. This developed image is sequentially transferred to a substrate such as paper, and permanently affixed thereto.

U.S. Pat. No. 4,404,574 to Burwasser et al discloses an electrographic printing system wherein a latent image is projected onto a dielectric record member. The dielectric record member is a clear, transparent, flexible film which comprises a resin film base, a conductive layer on the base, and a dielectric layer thereon. The dielectric layer may be provided with an "anti-blocking" material which enables the film member to be unrolled from a roll holder and transported across an energized electrode. The "anti-blocking" material has no electric function, and is added so that the dielectric coating does not stick to the backside of the substrate when the film is rolled up. The "anti-blocking" material is suspended in the dielectric layer, and may be high density polyethylene or synthetic silica. The member is different from reusable ionographic image receivers in that the latent image is permanently fixed to the member.

Ionography is, in some respects, similar to the more familiar form of imaging used in electrophotography. However, the two types of imaging are fundamentally different. In electrophotography, an electrophotographic plate containing a photoconductive insulating layer on a conductive layer is imaged by first uniformly electrostatically charging its surface. The plate is then exposed to a pattern of activating electromagnetic radiation such as light. The electrophotographic plate is insulating in the dark and conductive in light. The radiation therefore selectively dissipates the charge in the illuminated areas of the photoconductive insulating layer while leaving behind an electrostatic latent image in the non-illuminated areas. Thus, charge is permitted to flow through the imaging member. The electrostatic latent image may then be developed to form a visible image by depositing finely divided electroscopic marking particles on the surface of the photoconductive insulating layer. The resulting visible image may then be transferred from the electrophotographic plate to a support such as paper. This imaging process may be repeated many times with reusable photoconductive insulating layers.

Electrophotographic imaging members may be provided in a number of forms and may be provided with overcoatings for protecting the imaging member. For example, U.S. Pat. No. 4,006,020 to Polastri discloses an overcoated electrostatographic photoreceptor. The disclosed overcoating comprises a first polymer which is an addition polymerization product of methyl methacrylate, n-butylacrylate, and acrylic or methacrylic acid, and a second polymer which is an addition polymerization product of styrene and maleic anhydride. U.S. Pat. No. 4,472,491 to Wiedemann discloses an electrophotographic recording material comprising a transparent protective layer comprised of an acrylated binder. U.S. Pat. No. 4,260,671 to Merrill discloses a photoconductive member which is provided with a polycarbonate overcoat.

Protective overcoats for electrophotographic imaging members also include silicone overcoats. For example, U.S. Pat. No. 4,770,963 to Pai et al discloses a photoresponsive imaging member comprising a first overcoating layer of nonstoichiometric silicon nitride, and a second overcoating layer of a silicone-silica hybrid polymer. U.S. Pat. No. 4,565,760 to Schank discloses protective overcoatings for photoresponsive imaging members comprising a dispersion of colloidal silica and a hydroxylated silsesquixone in an alcoholic medium. U.S. Pat. No. 4,439,509 to Schank discloses electrophotographic imaging members comprising a coating of a cross-linked siloxanolcolloidal silica hybrid material which may be prepared by hydrolyzing trifunctional organosilanes and stabilizing the hydrolyzed silanes with colloidal silica.

U.S. Pat. No. 4,743,492 to Wilson discloses a primer-topcoat system for various substrates. A primer of a mixture of an acrylic resin and an epoxy compound derived from the condensation product of epichlorohydrin and bisphenol A or bisphenol AF is provided with a topcoat of polyvinyl fluoride. The use of the primer-topcoat system is not disclosed as being for electrophotographic or ionographic applications.

Ionographic imaging members differ in many respects from the above-described and other electrophotographic imaging members. The imaging member of ionographic devices is electrically insulating so that charge applied thereto does not disappear prior to development. Charge flow through the imaging member is undesirable since charge may become trapped, resulting in a failure of the device. Ionographic receivers possess negligible, if any, photosensitivity. The absence of photosensitivity provides considerable advantages in ionographic applications. For example, the electroreceptor enclosure does not have to be completely impermeable to light, and radiant fusing can be used without having to shield the receptor from stray radiation. Also, the level of charge decay (the loss of surface potential due to charge redistribution or opposite charge recombination) in these ionographic receivers is characteristically low, thus providing a constant voltage profile on the receiver surface over extended time periods.

However, ionographic imaging members generally suffer from a number of disadvantages. In an ionographic machine, the electroreceptor comes into contact with development and cleaning sub-systems. Also, paper contacts the surface of the electroreceptor in the transfer zone. Thus, an electroreceptor material which has good electrical properties for ionographic applications, i.e. electrically insulating, may be triboelectrically incompatible with the sub-systems of the ionographic machine. For example, a particularly good electroreceptor dielectric material may be incompatible with toner contact because of high triboelectric charging. This incompatibility leads to, among other problems, cleaning failures because of the poor toner release properties of the dielectric material.

A further problem with many ionographic imaging members involves high charge decay and charge trapping. Materials having a high dielectric constant and good toner release properties may suffer from high surface charge decay and charge trapping. For example, materials having a high dielectric constant, such as polyvinyl fluoride, have high charge decay rates and bulk charge trapping.

It is also desirable for exposed surfaces of a dielectric receiver to have good wear, abrasion and scratch resistant properties. Organic film forming resins used in the dielectric imaging layer are subject to wear, abrasions and scratches which adversely affect the response of the dielectric receiver.

The above and other problems limit the use of various materials in ionographic charge receivers. The problems are further complicated in that there are very few materials with high dielectric constants which have the desirable properties for ionographic imaging.

SUMMARY OF THE INVENTION

It is an object of the invention to provide materials for an electroreceptor which are compatible with the various conditions within an ionographic imaging system.

It is an object of the invention to provide an overcoating layer for an electroreceptor which is electrically compatible with developer material.

It is another object of the invention to provide an electroreceptor which is less susceptible to cleaning failure.

It is also an object of the invention to reduce charge decay rates and bulk charge trapping in an electroreceptor.

It is another object of the invention to provide at least one blocking layer for an electroreceptor which prevents charge injection.

Another object of the invention is to provide a materials combination for an electroreceptor which reduces surface charge decay and bulk charge trapping.

It is another object of the invention to provide wear, abrasion and scratch resistant overcoatings for electrographic imaging members.

It is also an object of the invention to provide clear, thin overcoatings which are electrically and chemically compatible for electrographic imaging members.

It is a further object of the invention to provide a lower energy surface to a dielectric image receiver which provides beneficial toner transfer efficiency and receiver cleaning.

In accordance with a first embodiment of the present invention, an ionographic imaging member comprises an electrically conductive layer, a dielectric imaging layer and an overcoating layer comprising acrylate, acrylic homopolymer or copolymer, polycarbonate or other materials which are electrically compatible with the sub-systems of the ionographic imaging device. Other overcoating materials include polyurethane; polyesters; polytetrafluoroethylene and other fluorocarbon polymers; polyarylether; polybutadiene and copolymers with styrene, vinyl/toluene, and acrylate; polysulfone; polyethersulfone; polyaryl sulfone; polyethylene and polypropylene; polyimide; poly (amide-imide); polyetherimide; polyethylpentene; polyphenylene sulfide; polystyrene and acrylonitrile copolymers; polyvinylchloride and polyvinyl acetate copolymers and terpolymers; silicones; acrylics and copolymers thereof; alkyds; amino resins; cellulosic resins and polymers; epoxy resins and esters; nylon and other polyamides; phenolic resins; phenoxy resins; phenylene oxide; and polyvinyl fluoride. In addition, one or more blocking layers may be provided for preventing charge injection.

In accordance with a second embodiment of the present invention, there is provided an ionographic imaging member comprising an electrically conductive layer, a dielectric imaging layer, and at least one blocking layer comprised of a material which prevents or reduces charge injection. The blocking layer may be situated between the conductive layer and the dielectric layer, and/or overcoated on the dielectric imaging layer. The blocking layer may also function as an overcoat when coated on the dielectric imaging layer provided the charge blocking layer is electrically compatible with the sub-systems of an ionographic imaging machine.

In accordance with a third embodiment of the present invention, there is provided an ionographic imaging member comprising a dielectric imaging layer which is comprised of a dielectric material and a material (charge blocking material) which prevents or reduces charge injection.

BRIEF DESCRIPTION OF THE DRAWINGS

A more complete understanding of the present invention can be obtained by reference to the accompanying drawings, wherein.

DESCRIPTION OF PREFERRED EMBODIMENTS

The electroreceptors of the present invention comprise an electrically conductive layer and a charge accepting layer (dielectric imaging layer). The electroreceptor is further provided with an overcoating layer (which may also function as a charge blocking layer) and/or at least one charge blocking layer, and/or a charge blocking material dispersed in the imaging layer.

Figure 1:
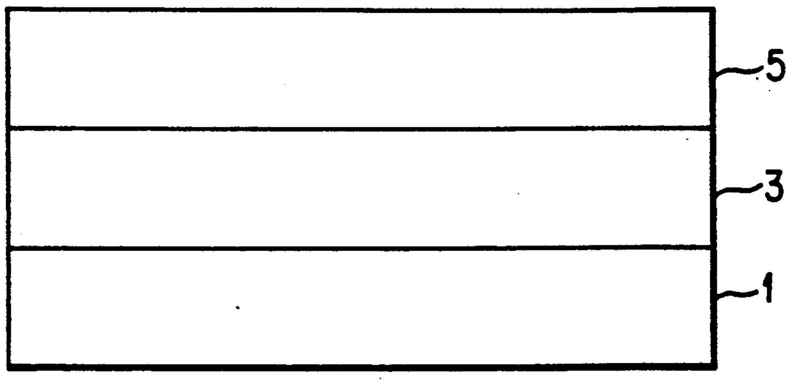
FIG. 1 is a cross-sectional view of an embodiment of an electroreceptor of the invention.

Illustrated in FIG. 1 is a cross-sectional view of an electroreceptor of the present invention comprising a conductive layer 1, a dielectric imaging layer 3 and an overcoating layer 5.

Generally, any suitable electrically conductive material may be employed in the conductive layer 1. The conductive layer may be, for example, a thin vacuum deposited metal or metal oxide coating, electrically conductive particles dispersed in a binder, or an electrically conductive polymer such as polypyrrole, polythiophenes, or the like. The conductive layer may be applied to a surface by any suitable coating process. Generally, the conductive layer should be continuous, uniform and have a thickness of between about 0.05 micrometer and about 25 micrometers. Any thickness outside this range also may be utilized, if desired.

Typical metals and metal oxides include aluminum, indium, gold, tin oxide, indium tin oxide, antimony tin oxide, silver, nickel, copper iodide, silver paint, and the like. Typical electrically conductive particles that may be dispersed in a binder include carbon black, aluminum, indium, gold, tin oxide, indium tin oxide, silver, nickel, and the like, and mixtures thereof. The particles should have an average particle size that is less than the dry thickness of the conductive layer. Typical film forming binders for conductive particles include polyurethane, polyesters, fluorocarbon polymers, polycarbonates, polyarylethers, polyaryl sulfones, polybutadiene and copolymers with styrene, vinyl/toluene, acrylates, polyether sulfones, polyimides, poly (amide-imides), polyetherimides, polystyrene and acrylonitrile copolymers, polysulfones, polyvinylchloride, and polyvinyl acetate copolymers and terpolymers, silicones, acrylates and copolymers, alkyds, cellulosic resins and polymers, epoxy resins and esters, nylon and other polyamides, phenolic resins, phenylene oxide, polyvinylidene fluoride, polyvinylfluoride, polybutylene, polycarbonate co-esters, and the like. The relative quantity of conductive particles added to the binder depends to some extent on the conductivity of the particles. Generally, sufficient particles should be added to achieve an electrical resistivity of less than $10^5$ ohms/square for the final dry solid conductive layer.

Conductive coatings are commercially available from many sources. Typical conductive coating compositions include Red Spot® Olefin conductive primer (available from Red Spot Paint & Varnish Co., Inc.), Aquadag Alcodag and other "Dag" coatings (available from Acheson Colloids Co.), LE12644 (available from Red Spot Paint & Varnish Co., Inc.), Polane® E67BC24, E75BC23, E67BC17 (available from Sherwin Williams Chemical Coatings), ECP117 polypyrrole polymer (available from Polaroid Corp.), and the like.

If desired, any suitable solvent may be employed with the film forming binder polymer material to facilitate application of the electrically conductive layer. The solvent should dissolve the film forming binder polymer of the conductive layer. Typical combinations of film forming binder polymer materials and solvents or combinations of solvents include polycarbonate (Lexan 4701 available from General Electric Co.) and dichloromethane/1,1,2-trichloroethane, copolyester (Vitel® PE100, available from Goodyear Tire & Rubber Co.) and dichloromethane/1,1,2-trichloroethane, polyester (du Pont 49000, available from E.I. du Pont and de Nemours & Co.) and dichloromethane/1,1,2-trichloroethane, polyacrylic (duPont Acrylic 68070 available from E.I du Pont and De Nemours & Co.) and aromatic hydrocarbons, polyurethane (Estane® 5707FIP, available from B.F. Goodrich Chemical Co.) and tetrahydrofuran/ketone blend, ECP-117 polypyrrole available from Polaroid Corp and alcohols, esters, acetic acid, dimethyl formamide, alone and in blends, and the like.

The dielectric imaging layer 3 of the invention preferably comprises a material having a high dielectric constant. Such materials may be used alone or may be pigmented with a dielectric pigment to increase the dielectric constant. Suitable dielectric materials include polyvinyl fluoride (PVF), available as Tedlar from du Pont, polyvinylidene fluoride, available as Kynar from Pennwalt, and mixtures of insulating resins with high dielectric constant pigments. Dielectric pigments include inorganic materials. Typical inorganic materials include ceramics, aluminum oxide, titanium dioxide, zinc oxide, barium oxide, glasses, magnesium oxide and the like.

The dielectric imaging layer may also contain any suitable dissolved or dispersed materials. These dissolved or dispersed materials may include, for example, inorganic materials such as barium titanate, transition metal oxides of iron, titanium, vanadium, manganese, or nickel, phosphate glass particles and the like.

One specific class of dispersed materials is obtained from the transition metal oxides by making use of their property of multiple valency. Transition metal phosphate glasses may be obtained by mixing and subsequently melting sufficient quantities of the transition metal oxides with phosphorous pentoxide. This process creates a glass with predetermined dielectric properties in which a desired composite material dielectric constant can be obtained in a predictable manner. One example of such a glass is $4.5TiO_{2-x}{\cdot}2P_2O_5$, where x determines the ratio of the two valence states of Ti. The larger the x the more $Ti^{3+}$ ion is present. The ratio of $Ti^{3+}$ to $Ti^{4+}$ determines the dielectric properties of the glass. Thus, the smaller the value of x, the smaller the value of the DC dielectric constant. Such a glass may be produced by first obtaining an appropriate $TiO_2$-$P_2O_5$ mixture by heating a calculated mix of powdered $TiO_2$ and $(NH_4)_2HPO_4$ in an argon atmosphere. This mixture is doped as required with $Ti_2O_3$. After thorough mixing, the resultant powder is heated in an argon atmosphere until it melts. It is maintained in a molten state for a period of about 1 hour and then cast by pouring directly from the melt. Alternatively, the glass may be shotted by conventional means. A value of $x=0.05$ yields a static dielectric constant of about 20 and a high frequency dielectric constant of about 6. Values in this range are easily achieved with all the transition metal oxides. Values as high as 100 can be obtained for the static dielectric constant. Once formed, the glass is ground or otherwise processed into fine particles for use in the electroreceptor of a desired dielectric constant. In preparing the transition metal phosphate glasses, other transition metals such as V, Mn, Ni, Fe and the like may be substituted for Ti in the above formula. The values in front of the oxide and the pentoxide may also be varied. Thus, with the pentoxide value fixed, the other value may be varied from 2.5 to 6 to achieve a glass. These materials are humidity insensitive, tough, vary in transparency from clear at $x=0$ to smoky for $x=0.1$, and are nontoxic in that they are inert in this form.

It should also be appreciated that a host of other dielectric materials are listed in the Handbook of Chemistry and Physics, 66th Ed. 1985-1986, CRC Press, Inc., Section E, pages 49-59 and elsewhere which are potentially useful in dielectric imaging layers (electroreceptors), and their selection is easily achieved once the desired conditions stated above are recognized.

Insulating resins which may be doped with high dielectric constant pigments include polyurethanes and other materials, such as those film forming binder polymers described above for the conductive layer. High dielectric constant pigments include, for example, $TiO_2$ and $BaTiO_3$. When mixtures of insulating resins with high dielectric constant pigments are used, it is preferred that a composition with a dielectric constant of at least about 5 is obtained. However, dielectric materials having a dielectric constant less than about 5 may also be used, if desired.

Tests on various weight loadings of barium titanate in Lexan 3250®, a thermoplastic polycarbonate condensation product of bisphenol-A and phosgene from General Electric, were conducted to measure dielectric constants of dielectric materials of varying barium titanate concentration. Samples were fabricated on brush grained aluminum flat plates and mounted on a portion of a 26.4 cm drum in an ambient scanner and rotated at 60 and/or 120 RPM. A 5 cm wide single wire corotron was used in a continuous charging, constant current mode giving (+ and −) 0.1, 0.2, 0.5, and/or 1.0 μA charging currents. The charging was stopped before 40 V/μm fields appeared on the sample. Both opposite sign charging and grounded brush methods were used to erase charges between experiments. Although not all currents and speeds were used on each sample, various combinations plus time rate of charge loss from several charge levels were performed on each sample to determine charge decay and saturation effects.

The effective dielectric constant gives some measure of the voltage levels which would be reached by depositing corona ions on the surface of the samples assuming capacitive charging. The saturation effects (showing as non-capacitive charging) make the apparent dielectric constant higher for higher charge levels. Thus, the voltages reached at higher surface charge densities are below what one would calculate from the values listed below.

TABLE I

| Test | Wt. Load $BaTiO_3$ in Lexan 3250 ® | Thickness (micrometers) | Effective Dielectric Constant | Saturation Voltage (current dependent) |
|---|---|---|---|---|
| 1 | 25% | 55 | 2.4–2.8 | >2 K |
| 2 | 50% | 50 | 3.8–4.5 | 1.6 K to >2 K |
| 3 | 75% | 55 | 19.2–20.8 | 400 V |
| 4 | 0% | 84 | 2.0 | >2 K |
| 5 | 0% | 85 | 2.1 | >2 K |
| 6 | 55% | 50 | 5.2–5.3 | >1.6 K |
| 7 | 60% | 85 | 6.5–7.6 | >1.6 K |
| 8 | 65% | 85 | 8.2 | >1.4 K |
| 9 | 70% | 86 | 11.6–12.5 | >1 KV |

For example, polycarbonate may be loaded with $BaTiO_3$ to achieve a composition having a dielectric constant of at least about 5. It may be necessary to incorporate as much as about 70% by weight dielectric pigment to achieve a desired dielectric material having a dielectric constant of at least about 12. Generally, from about 3 weight percent to about 85 weight percent may be used, preferably 5 weight percent to about 70 weight percent.

The thickness of the dielectric layer 3 typically is within the range of from about 6 micrometers to about 875 micrometers, preferably from about 13 micrometers to about 250 micrometers. Other thicknesses may be used, provided the imaging layer is capable of sufficiently retaining charges applied thereon while maintaining other desirable electrical properties.

High dielectric constant materials may be electrically incompatible when they come in contact with development and cleaning sub-systems of the electroreceptor device. For example, an electroreceptor material having good electrical properties for ionographic applications, such as polyvinylidene fluoride, may be triboelectrically incompatible with the other sub-systems. However, materials with high dielectric constants such as polyvinyl fluoride which have good toner release properties and are triboelectrically compatible may suffer from high charge injection and charge trapping. As a result, cleaning failures, charge injection, charge trapping and the like can result from use of such high dielectric constant materials.

To prevent cleaning failures, charge injection, charge trapping and the like, the present invention provides an overcoating layer 5 comprising a material which is electrically compatible with the development and cleaning sub-systems of the electroreceptor device. This arrangement allows the surface properties of the electroreceptor to be controlled by the overcoating layer 5 while the bulk electrical properties are obtained by appropriate selection of the dielectric imaging layer material. The overcoating layer may also function as a charge blocking layer, preventing charge injection and bulk charge trapping.

Materials which may be used in the overcoating layer 5 include all the film forming binder materials discussed above for the conductive layer, for example, polymers such as acrylates, acrylic homopolymers and copolymers, polycarbonates, polyesters and polyurethanes. Other materials which are electrically compatible with the sub-systems of the electroreceptor device and which may be coated onto the dielectric imaging layer may be utilized.

Preferred overcoating layer materials are silicones, and in particular, silicone hard coats. Silicone materials which may be used in the present invention include silicone-silica hybrid polymers disclosed in U.S. Pat. No. 4,770,963; dispersions of colloidal silica and hydroxylated silsesquixone in alcoholic media disclosed in U.S. Pat. No. 4,565,760; crosslinked siloxanol-colloidal silica hybrid materials disclosed in U.S. Pat. No. 4,439,509; and silicone hard coat materials commercially available from General Electric Corporation as Silicone Hard Coatings; from SDC Coatings, Inc., as Silvue Abrasion Resistant Coatings, formerly sold as Vestar Coatings from Dow Corning; and Owens Illinois-NEG TV Products, Inc., as glass resins. The relevant disclosures of the above patents is hereby incorporated by reference. Silicone hard coat materials are sometimes referred to as cross-linkable siloxane-colloidal silica hybrid materials, being characterized as dispersions of colloidal silica and a partial condensate of a silanol in an alcohol/water media. Preferably, the silicon hard coat materials do not contain silica, since silica tends to attract moisture which may affect conductivity.

When the silicone hard coat materials are utilized, they preferably are applied with a primer layer which promotes adhesion of the silicone hard coats to the dielectric layer. The primer layer may comprise, for example, acrylates, such as Elvacite 2008 from du Pont, and methacrylates and polyesters. For example, a dielectric imaging layer comprised of a polycarbonate polymer such as polycyclohexylidene polycarbonate may be spray coated with primer solution to a dry thickness between about 300 Angstroms to about 700 Angstroms, and then overcoated with a silicone hard coat material.

The thickness of the overcoating layer 5 is chosen such that the overall function of the electroreceptor is not adversely affected. Generally, a thickness in the range of from about 0.1 micrometer to about 15 micrometers, preferably from about 1 micrometer to about 4 micrometers, may be used.

In tests in an ionographic printing machine, electroreceptors comprising an imaging dielectric layer such as Kynar generally suffer from immediate cleaning failure. However, an imaging member having a Kynar dielectric layer and an overcoating layer of polycarbonate or acrylate yields good imaging without cleaning failure.

Figure 2:
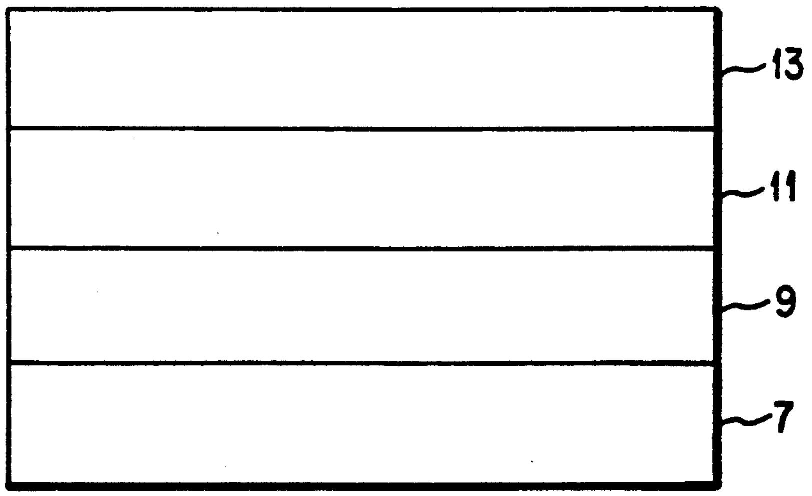
FIG. 2 is a cross-sectional view of another embodiment of an electroreceptor of the invention.

Another embodiment of the invention is shown in FIG. 2, which illustrates an electroreceptor comprising a conductive layer 7, a charge blocking layer 9 and/or a charge blocking layer 13, and a dielectric imaging layer 11. The conductive layer 7 and dielectric imaging layer 11 may comprise the same materials as those described above for the respective conductive and dielectric imaging layers. The charge blocking layers 9 and 13 are provided to prevent charge injection, thereby reducing surface charge decay and bulk charge trapping in the device.

The charge blocking layers 9 and 13 may be provided in a number of configurations. For example, an electroreceptor of the present invention may contain conductive layer 7, charge blocking layer 9 and dielectric imaging layer 11. It is preferred to provide charge blocking layer 9 between the conductive layer 7 and dielectric imaging layer 11 for preventing charge injection. Alternatively, an electroreceptor may be provided with conductive layer 7, dielectric imaging layer 11 and charge blocking layer 13. Still further, an electroreceptor can be provided exactly as shown in FIG. 2, i.e., conductive layer 7, blocking layer 9, dielectric imaging layer 11 and charge blocking layer 13. The materials used in the blocking layers 9 and 13 do not have to be the same.

The charge blocking layers of the present invention may comprise any material which is capable of preventing charge injection, for example, acrylic homopolymers and copolymers. Suitable acrylic polymers include du Pont adhesive such as Product Code 68070 adhesive and 68080 adhesive. Du Pont Product Code 68070 adhesive is a water white viscous acrylic adhesive having 34%-36% solids by weight and a viscosity of 340-350 cps. Du Pont Product Code 68080 adhesive is pale straw colored, low viscosity liquid acrylic having 29.0%-31.0% solids by weight. The blocking layer may be organic or inorganic and may be deposited by any suitable technique. For example, if the blocking layer is soluble in a solvent, it may be applied as a solution and the solvent can subsequently be removed by any conventional method such as by drying. Typical blocking layers include polyvinylbutyral, organosilanes, epoxy resins, polyesters, polyamides, polyurethanes, pyroxyline vinylidene chloride resin, silicone resins, fluorocarbon resins and the like containing an organo metallic salt. Other blocking layer materials include nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl) titanate, isopropyl di(4-aminobenzoyl) isostearoyl titanate, isopropyl tri(N-ethylaminoethylamino)titanate, isopropyl trianthranil titanate, isopropyl tri(N,N-dimethyl-ethylamino) titanate, titanium-4-amino benzene sulfonate oxyacetate, titanium 4-aminobenzoate isostearate oxyacetate, $[H_2N(CH_2)_4]CH_3Si(OCH_3)_2$, (gamma-aminobutyl) methyl diethoxysilane, $[H_2N(CH_2)_3]CH_3Si(OCH_3)_2$, and (gamma-aminopropyl) methyl diethoxysilane, as disclosed in U.S. Pat. No. 4,338,387, U.S. Pat. No. 4,286,033 U.S. Pat. No. 4,291,110. The disclosures of U.S. Pat. No. 4,338,387, U.S. Pat. No. 4,286,033 and U.S. Pat. No. 4,291,110 are hereby incorporated herein. A preferred blocking layer comprises a reaction product between a hydrolyzed silane and the oxidized surface of a metal ground plane layer (conductive layer). The oxidized surface inherently forms on the outer surface of most metal ground plane layers when exposed to air after deposition. This combination enhances electrical stability at low RH. However, the oxidized surface does not provide the desirable charge blocking capabilities, and therefore a separate charge blocking layer is preferred. The hydrolyzed silanes have the general formula:

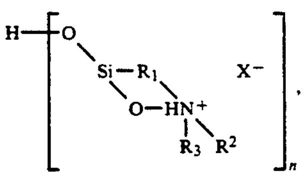
, or I

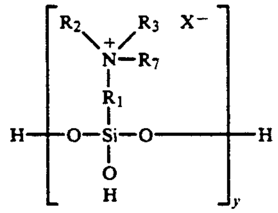
II wherein $R_1$ is an alkylidene group containing 1 to 20 carbon atoms, $R_2$, $R_3$ and $R_7$ are independently selected from the group consisting of H, a lower alkyl group containing 1 to 3 carbon atoms and a phenyl group, X is an anion of an acid or acidic salt, n is 1, 2, 3 or 4, and y is 1, 2, 3 or 4.

The imaging member is preferably prepared by depositing, on a metal oxide layer of a metal conductive layer, a coating of an aqueous solution of the hydrolyzed aminosilane at a pH between about 4 and about 10, and drying the reaction product layer to form a siloxane film.

Siloxane coatings are described in U.S. Pat. No. 4,464,450 to L. A. Teuscher, the disclosure of this patent hereby being incorporated herein. Other materials suitable for use as charge blocking layer materials include aminopropyltriethoxy silane and other amino silane compositions, either alone or with mixtures of metal organo compounds, for example, zirconium acetylacetonate, zirconium butoxide, titanates, and the like. Charge blocking materials also include polymers of basic nitrogen composition, for example, 2-vinyl pyrridine, 4-vinyl pyrridine; polymers reacted to form a basic salt such as poly(vinylmethylether/maleic anhydride) copolymer reacted with sodium hydroxide; poly-2-hydroxyethylmethacrylate, poly-2-hydroxypropylmethacrylate and similar homologs. Other blocking layer materials include blocking materials for electrophotographic use disclosed in U.S. Pat. Nos. 3,932,179; 4,082,551; 3,747,005; 4,010,031; 3,859,576; 4,123,267; 4,282,294; 4,485,161 and 3,640,708, the disclosures of which are incorporated herein. The above-described materials may be used either alone or in mixtures.

The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. Generally, a weight ratio of blocking layer material and solvent of between about 0.05:100 and about 0.5:100 is satisfactory for spray coating.

The charge blocking layers 9 and 13 of the invention are preferably of a thickness in the range of from about 0.01 micrometer to about 15 micrometers, preferably from about 0.1 micrometer to about 4 micrometers. Effective prevention of charge injection and reduction of surface charge decay and bulk charge trapping may be obtained at submicron thicknesses. For example, submicron thickness layers can be obtained by coating a layer of charge blocking material on an electroreceptor having a conductive layer and a dielectric imaging layer, and removing the coated charge blocking material by immersing the film in a solvent such as methylene chloride. A conductive ground plane is re-coated on the device if it is removed by the solvent. Sufficient coated charge blocking material is believed to remain as a layer having a submicron thickness after "removal" with solvent. Devices so produced reduce charge decay and bulk charge trapping. Submicron thicknesses may also be applied by spray, dip, vapor deposition, extrusion, flow coating, and the like.

In accordance with another aspect of the present invention, charge blocking layer materials as described above may be incorporated within a dielectric imaging layer instead of, or in addition to, being present in the form of one or more blocking layers For example, from about 1 weight percent to about 25 weight percent, preferably from about 1 weight percent to about 15 weight percent, of charge blocking layer material based on total weight of the dielectric imaging layer may be present in the dielectric imaging material which is coated on the electroreceptor to form a dielectric layer.

Devices in accordance with the present invention effectively avoid high charge decay, avoid bulk charge trapping, prevent charge injection into the dielectric layer, avoid cleaning failures, and permit use of many dielectric materials otherwise imcompatible with other materials in and used in connection with ionographic imaging machines.

The invention will be further illustrated in the following examples, it being understood that these examples are illustrative only and that the invention is not limited to the materials, conditions, process parameters and the like recited herein.

EXAMPLES 1-16

Various electroreceptors are fabricated to illustrate the effect of a blocking layer in reducing charge decay rates and bulk charge trapping. Electroreceptors with and without blocking layers are fabricated having a ground plane (conductive layer), a first blocking layer, a dielectric imaging layer, and a second blocking layer. The ground plane used in these Examples comprises a 12 micrometers thickness layer of LE-12644, a carbon black conductive coating in a binder resin, available from Red Spot Paint and Varnish Company. The dielectric imaging layer of the Examples is a 4.3 mil thick layer of Tedlar. All coatings are applied by spray coating. Table 2 summarizes electrical charging results of the Tedlar films coated as described, illustrating the effect of the blocking layer(s) in reducing charge decay rates and bulk charge trapping. Blank spaces in Table 2 indicate that no measurement was taken. All samples were initially charged positive to about 800-1000 volts.

TABLE 2

RECEPTORS WITH DIFFERENT BLOCKING LAYERS
Charge Decay Rates For Positive Charge Deposition on 4.3 mil Coated Tedlar
(Rates are for first 20 seconds after charge disposition)

| | | | | | | | | 1 charging cycle | |
|---|---|---|---|---|---|---|---|---|---|
| Sample No. | Blocking Layer 13 (thickness in micrometers) | Dielectric Imaging Layer 11 | Blocking Layer 9 (thickness in micrometers) | Conductive Layer 7 (thickness in micrometers) | Charge Decay Rate 1 cycle | 3 cycles | 10 cycles | Remaining voltage after 320 sec | Surface voltage* after 320 sec |
| 1 (Control) | — | Tedlar | - | LE 12644 (12) | 20 v/sec | | | 100 v | +33 v |
| 2 | — | " | Lexan 4701 (16) | " | 18 v/sec | | 10 v/sec | 259 v | 204 v |
| 3 | Lexan 4701 (16) | " | — | " | 9.5 v/sec | 7 v/sec | 4.5 v/sec | | |
| 4 | Lexan 4701 (16) | " | Lexan 4701 (16) | " | 11.75 v/sec | 6.5 v/sec | 6.5 v/sec | | |
| 5 | — | " | PE200 (12) | " | 14 v/sec | 12 v/sec | 9.5 v/sec | | |
| 6 | PE200 (12) | " | — | " | 14.25 v/sec | 12 v/sec | 9.25 v/sec | | |
| 7 | PE200 (12) | " | PE200 (12) | " | 14.75 v/sec | 11.75 v/sec | 6.5 v/sec | | |
| 8 | — | " | DuPont 68070 (18) | " | 4.75 v/sec | 3.75 v/sec | 2.5 v/sec | 624 v | +91 v |
| 9 | DuPont 68070 (18) | " | — | " | 5.5 v/sec | 4.2 v/sec | 2.75 v/sec | 570 v | |
| 10 | DuPont 68070 (18) | " | DuPont 68070 (18) | " | 2.5 v/sec | 1.75 v/sec | 1.0 v/sec | 760 v | +134 v |
| 11 | — | " | DuPont 68080 (12) | " | 2.25 v/sec | 1.5 v/sec | 1 v/sec | 854 v | +52 v |
| 12 | DuPont 68080 (10) | " | — | " | 2.75 v/sec | 1.75 v/sec | 1 v/sec | 840 v | 53 v |
| 13 | DuPont 68080 (10) | " | DuPont 68080 (12) | " | 1.6 v/sec | 1.25 v/sec | 0.25 v/sec | 950 v | 54 v |
| 14 | DuPont 68080 (submicron) | " | DuPont 68080 (submicron) | " | 3 v/sec | — | — | 797 v | 80 v |
| 15 (Control) | — | " | — | " | 26 v/sec | — | — | 12 v | |
| 16 (Control) (Heated to 120° C. | — | " | — | " | 25 v/sec | — | — | 22 v | |

TABLE 2-continued

RECEPTORS WITH DIFFERENT BLOCKING LAYERS
Charge Decay Rates For Positive Charge Deposition on 4.3 mil Coated Tedlar
(Rates are for first 20 seconds after charge disposition)

| Sample No. | Blocking Layer 13 (thickness in micrometers) | Dielectric Imaging Layer 11 | Blocking Layer 9 (thickness in micrometers) | Conductive Layer 7 (thickness in micrometers) | Charge Decay Rate 1 cycle | 3 cycles | 10 cycles | 1 charging cycle Remaining voltage after 320 sec | Surface voltage* after 320 sec |
|---|---|---|---|---|---|---|---|---|---|
| ½ hr before coating) | | | | | | | | | |

*Surface potential after voltage neutralization and charge redistribution.

The sample of Example No. 13 above is cut in half, and all of the coatings are removed by immersing the film in methylene chloride. The Tedlar film is recovered, dried and re-coated with a LE-12644 ground plane. Test results (shown as Example 14 in Table 2) show that the charge decay rate and bulk charge trapping are still substantially reduced, indicating that the original blocking layer coatings are still present at presumably submicron thickness. Immersion of uncoated Tedlar film in methylene chloride produces no decrease in charge decay rate or bulk charge trapping.

The results in Table 2 illustrate that the charge decay rate of Tedlar film with a conductive layer is from about 20 V/sec to about 26 V/sec. Heating the sample (Example 16) did not substantially affect the charge decay rate. Coating the Tedlar film with either Lexan 4701, a copolymer of polycarbonate and a phthalate polyester available from G.E., or with PE-200 polyester available from Goodyear, has some effect in reducing charge decay rate compared to the control examples. Charge blocking layers of acrylic resins Nos. 68070 and 68080, available from du Pont, applied to Tedlar have a dramatic charge decay reduction effect. Reduction in bulk charge trapping is also seen.

Bulk charge trapping is measured by charging the surface of dielectric imaging layer (with or without blocking layers) to a suitable voltage, discharging the coating to zero volts, and measuring the surface potential as a function of time which changes due to bulk trapped charges migrating back to the surface. For example, the sample from Example 2 is charged to a surface potential of about 1050 V and discharged to zero. One minute after the discharge, a surface voltage level of 425 V is measured. The sample of Example 11 is charged to a surface potential of about 1100 volts and discharged to zero. One minute after the discharge, a surface voltage level of 50 V is measured.

EXAMPLE 17

An electroreceptor was prepared using polyvinylidene fluoride as the dielectric coating. The coating is applied on the surface of an 84 mm diameter aluminum drum about 11¼ inches in length using an electrodeposition coating process described in U.S. Pat. No. 3,635,809. The finished coating is about 12 mils thick.

The resulting electrographic imaging member is substituted for the xerographic drum in a Xerox 2830 xerographic copier which utilizes magnetic brush development. The Xerox 2830 xerographic copier, prior to modification, comprises an electrophotographic drum around the periphery of which are mounted a charging station to deposit a uniform electrostatic charge, an exposure station, a magnetic brush development station, a paper sheet feeding station, an electrostatic toner image transfer station, and a toner image fusing station, and a blade cleaning station. The Xerox 2830 xerographic copier is modified to substitute a fluid jet assisted ion projection head similar to the head for the exposure station of the copier.

The magnetic brush developer employed comprises toner particles having an average particle size of about 12 micrometers and comprising a styrene copolymer pigmented with about 10 percent carbon black and carrier particles having an average size between about 50 and about 100 micrometers comprising uncoated semiconductive ferrite particles. The magnetic brush developer also contains minor amounts of an external additive comprising zinc stearate and colloidal silica particles.

The type of ion projection head substituted for the exposure system comprises an upper casting of stainless steel having a cavity. A pair of extensions on each side of the head form wiping shoes which ride upon the outboard edges of the dielectric image layer to space the ion projection head about 760 micrometers from the imaging surface of the dielectric image layer. An exit channel including a cavity exit region is about 250 micrometers (10 mils) long. A large area marking chip comprising a glass plate upon which is integrally fabricated thin film modulating electrodes, conductive traces and transistors is used for modulation of the ion stream at the exit channel. The width across the cavity is about 3175 micrometers (125 mils) and a corona wire is spaced about 635 micrometers (25 mils) from each of the cavity walls. A high potential source of about +3,600 volts is applied to the corona wire through a one megohm resistance element and a reference potential of about +1,200 volts is applied to the cavity wall. Control electrodes of an individually switchable thin film element layer (an array of 300 control electrodes per inch) on the large area marking chip are each connected through standard multiplex circuitry to a low voltage source of +1,220 volts or +1,230 volts, 10 to 20 volts above the reference potential. Each electrode controls a narrow "beam" of ions in the curtain-like air stream that exits from an ion modulation region in the cavity adjacent the cavity exit region. The conductive electrodes are about 89 micrometers (3.5 mils) wide, each separated from the next by 38 micrometers (1.5 mils). The distance between the thin film element layer and the cavity wall at the closest point is about 75 micrometers (3 mils). Laminar flow conditions prevail at air velocities of about 1.2 cubic feet per minute.

In operation, the imaging surface on the dielectric imaging layer on each electrographic drum is uniformly charged to about −1500 volts at the charging station, imagewise discharged to −750 volts with the ion stream exiting from the fluid jet assisted ion projection head to form an electrostatic latent image having a difference in potential between background areas and the image areas of about 750 volts, and developed with toner particles deposited from the two-component magnetic brush developer applied at the magnetic brush development station biased at about −1450 volts. The metal drum of each of the tested samples is electrically grounded.

The developer deposits toner in the image areas on the electroreceptor. However, the toner remaining on the electroreceptor after transfer to paper is smeared by the cleaning blade into a more or less uniform layer which adheres to the electroreceptor, and is transferred subsequently in both image and nonimage areas. This leads to an immediate cleaning failure in the machine.

Another electroreceptor is prepared as described above and then overcoated with about 3 micrometers of a polycarbonate polymer. The polycarbonate is applied by spray coating from a methylene chloride solution. The polycarbonate overcoated polyvinylidene fluoride electroreceptor is tested in the modified Xerox 2830 machine and produces excellent quality prints with no cleaning failure evident.

EXAMPLE 18

After degreasing, e.g., by treatment with methylene chloride, an aluminum tube is dipped in a solution of 0.5 g alpha-amino propyltriethoxy silane, 5.0 g water containing 3 drops of acetic acid and 95 g of ethanol, to form a blocking layer. The drum is heated at about 100° C. for ½ hour, and then coated with polyvinyl fluoride. A coating of polyvinyl fluoride is applied to form the dielectric layer using a dip coating process to form a layer about 10 mils thick. The resulting article effectively blocks charge injection at the aluminum interface and reduces charge decay rates.

EXAMPLE 19

Dielectric receivers are coated with a primer solution and a silicone hard coat material under laboratory conditions of 70° F. and 48% RH. The dielectric receivers comprise Xerox 5030 sized aluminum drums dip coated in a solution of polycyclohexylidene polycarbonate polymer to form a 29 micrometers thick dielectric layer. A primer solution of 0.1 wt. % Elvacite 2008 (du Pont) in 90/10 isopropyl alcohol/water is applied using a horizontal spray set up from Binks, Inc. Dry thicknesses of 300 to 600 Angstroms are applied by spraying and then air drying. An overcoat solution is prepared comprising 57.0 g of Owens Illinois glass resin (651L), a silsequixone material without silica of 35% solids, 170.0 g of methyl alcohol, 170.3 g of isobutyl alcohol, 2.0 g of silanol end blocked fluid (a dimethyl siloxane compatible plasticizer from Petrarch, Inc.) and 0.4 g of A-1100 (a compatible amine functional siloxane catalyst agent from Union Carbide Corp.). The overcoat solution is filtered before use and is applied by spray to achieve dry film thicknesses of 1-2 micrometers and 2-4 micrometers. The overcoat is air dried and then oven cured for about one hour at 125° C. in a forced air oven.

EXAMPLE 20

Dielectric receivers are prepared as in Example 19 except under laboratory conditions of 70° F. and 37% RH and a different overcoat solution is applied to the primer coat. The overcoat solution comprises 57.0 g of OI glass resin (651L) of 35% solids, 257.0 g of methyl alcohol, 84.0 g of isobutyl alcohol and 2.0 g of silanol endblocked fluid (Petrarch, Inc.). The overcoat solution is applied as in Example 19 to obtain overcoating thicknesses of 1-2 micrometers. The overcoated receivers are electrically characterized for charge uniformity, and decay and are found to perform in an identical manner as non-overcoated control samples, and have good wear and toner release properties.

While the invention has been described with reference to particular preferred embodiments, the invention is not limited to the specific examples given, and other embodiments and modifications can be made by those skilled in the art without departing from the spirit and scope of the invention.

What is claimed is:

1. An ionographic imaging member, comprising a conductive layer and a charge accepting layer wherein at least one member of the group consisting of a charge blocking material and an overcoat material is provided in said imaging member, said charge blocking material being present as a separate charge blocking layer adjacent said charge accepting layer or incorporated in said charge accepting layer, said overcoat material being provided in a separate overcoat layer which is electrically compatible with sub-systems of an ionographic imaging machine.

2. The member of claim 1, wherein said separate charge blocking layer and said overcoat layer comprise the same layer.

3. The member of claim 2, wherein said charge blocking material is selected from the group consisting of acrylates, polyesters, polycarbonates and siloxanes.

4. The imaging member of claim 1, wherein said charge accepting layer comprises material selected from the group consisting of polyvinyl fluoride, polyvinylidene fluoride, and insulating resins loaded with dielectric pigment.

5. The imaging member of claim 1, wherein the charge accepting layer has a dielectric constant of at least about 5.

6. The imaging member of claim 1, wherein said charge accepting layer comprises about 1 weight percent to about 25 weight percent of said charge blocking material.

7. The imaging member of claim 1, wherein said charge blocking layer is provided between said conductive layer and said charge accepting layer.

8. The imaging member of claim 1, wherein said overcoat material is selected from the group consisting of silicone hard coat resins, acrylates and polycarbonates.

9. The imaging member of claim 8, further comprising a primer layer between said overcoat layer and said charge accepting layer for promoting adhesion.

10. The imaging member of claim 9, wherein said primer layer comprises an acrylate polymer.

11. An ionographic imaging member, comprising:

an electrically conductive layer;

a charge accepting layer; and an overcoat layer comprising a material selected from the group consisting of acrylates, polycarbonates, acrylic homopolymers and copolymers, polyurethanes, polyesters, polytetrafluoroethylene, fluorocarbon polymers, polyarylethers, polybutadiene and copolymers of polybutadiene with styrene, vinyl/toluene and acrylate, polysulfones, polyether sulfones, polyaryl sulfones, polyethylene, polypropylene, polyimides, poly(amide-imide)s, polyetherimides, polyethylpentene, polyphenylene sulfides, polystyrene and acrylonitrile copolymers, polyvinylchloride and polyvinyl acetate copolymers and terpolymers, silicones, acrylics and copolymers thereof, alkyds, amino resins, cellulosic resins and polymers, epoxy resins and esters, nylon, polyamides, phenoxy resins, phenolic resins, and phenylene oxides.

12. The imaging member of claim 11, wherein said charge accepting layer comprises material selected from the group consisting of polyvinyl fluoride, polyvinylidene fluoride, and insulating resins loaded with dielectric pigment.

13. The imaging member of claim 12, wherein said dielectric pigment is at least one member selected from the group consisting of ceramics, aluminum oxides, titanium dioxide, zinc oxide, barium oxide, glasses and magnesium oxide.

14. The imaging member of claim 11, wherein the charge accepting layer has a dielectric constant of at least about 5.

15. The imaging member of claim 11, wherein the charge accepting layer comprises about 1 weight percent to about 25 weight percent of a charge blocking material.

16. The imaging member of claim 11, further comprising a charge blocking layer between said electrically conductive layer and said charge accepting layer.

17. The imaging member of claim 16, wherein said overcoat material is selected from the group consisting of silicone hard coat resins, acrylates and polycarbonates.

18. The imaging member of claim 11, wherein said overcoat material is a silicone hard coat resin.

19. The imaging member of claim 11, further comprising a primer layer between said overcoat layer and said charge accepting layer for promoting adhesion.

20. The imaging member of claim 19, wherein said primer layer comprises an acrylate polymer.

21. An ionographic imaging member, comprising:
an electrically conductive layer;
a charge accepting layer; and
at least one charge blocking layer comprising at least one material selected from the group consisting of acrylates, polyesters, polycarbonates and siloxanes.

22. The imaging member of claim 21, wherein said at least one charge blocking layer is between said conductive layer and said charge accepting layer.

23. The imaging member of claim 21, wherein said at least one charge blocking layer overcoats the charge accepting layer.

24. The imaging member of claim 21, comprising a first charge blocking layer between the conductive layer and the charge accepting layer, and a second charge blocking layer overcoating the charge accepting layer.

25. The imaging member of claim 24, further comprising an overcoat contiguous with said second charge blocking layer, said overcoat being formed of a material selected from the group consisting of acrylates, polycarbonates, acrylic homopolymers and copolymers, polyurethanes, polyesters, polytetrafluoroethylene, fluorocarbon polymers, polyarylethers, polybutadiene and copolymers of polybutadiene with styrene, vinyl/toluene and acrylate, polysulfones, polyether sulfones, polyaryl sulfones, polyethylene, polypropylene, polyimides, poly(amide-imide)s, polyetherimides, polyethylpentene, polyphenylene sulfides, polystyrene and acrylonitrile copolymers, polyvinylchloride and polyvinyl acetate copolymers and terpolymers, silicones, acrylics and copolymers thereof, alkyds, amino resins, cellulosic resins and polymers, epoxy resins and esters, nylon, polyamides, phenoxy resins, phenolic resins, and phenylene oxides.

26. The imaging member of claim 25, wherein said overcoat material is at least one of a silicone hard coat resin, an acrylate polymer and a polycarbonate.

27. The imaging member of claim 25, further comprising a primer layer between said overcoat layer and said charge blocking layer for promoting adhesion.

28. The imaging member of claim 21, wherein said charge accepting layer has a dielectric constant of at least about 5.

29. The imaging member of claim 21, wherein said charge accepting layer comprises material selected from the group consisting of polyvinyl fluoride, polyvinylidene fluoride, and mixtures of insulating resins loaded with dielectric pigment.

30. The imaging member of claim 29, wherein said dielectric pigment is at least one member selected from the group consisting of ceramics, aluminum oxides, titanium dioxide, zinc oxide, barium oxide, glasses and magnesium oxide.

31. An ionographic imaging member, comprising a conductive layer and a charge accepting layer, said charge accepting layer being comprised of a dielectric material and a charge blocking material selected from the group consisting of acrylates, polyesters, polycarbonates and siloxanes.

32. The imaging member of claim 31, wherein said charge accepting layer comprises from about 1 to about 25 weight percent of said charge blocking material.

33. The imaging member of claim 31, wherein said dielectric material is selected from the group consisting of polyvinyl fluorides, polyvinylidene fluoride, and mixtures of insulating resins loaded with dielectric pigment.

34. The imaging member of claim 33, wherein said dielectric pigment is at least one of ceramics, aluminum oxides, titanium dioxide, zinc oxide, barium oxide, glasses and magnesium oxide.

35. The imaging member of claim 31, further comprising an overcoat layer of a material selected from the group consisting of acrylates, polycarbonates, acrylic homopolymers and copolymers, polyurethanes, polyesters, polytetrafluoroethylene, fluorocarbon polymers, polyarylethers, polybutadiene and copolymers of polybutadiene with styrene, vinyl/toluene and acrylate, polysulfones, polyether sulfones, polyaryl sulfones, polyethylene, polypropylene, polyimides, poly(amide-imide)s, polyetherimides, polyethylpentene, polyphenylene sulfides, polystyrene and acrylonitrile copolymers, polyvinylchloride and polyvinyl acetate copolymers and terpolymers, silicones, acrylics and copolymers thereof, alkyds, amino resins, cellulosic resins and polymers, epoxy resins and esters, nylon, polyamides, phenoxy resins, phenolic resins, and phenylene oxides.

36. The imaging member of claim 35, wherein said overcoat material is at least one of a silicone hard coat resin, an acrylate polymer and a polycarbonate.

37. The imaging member of claim 35, further comprising a primer layer between said overcoat layer and said charge accepting layer for promoting adhesion.

38. The imaging member of claim 31, wherein the charge accepting layer has a dielectric constant of at least about 5.

39. The imaging member of claim 31, further comprising at least one charge blocking layer comprising a material selected from the group consisting of acrylates, polyesters, polycarbonates and siloxanes.

* * * * *